United States Patent [19]

Takamizawa et al.

[11] 4,057,596
[45] Nov. 8, 1977

[54] ANTI-STICKING SILICONE COMPOSITIONS OF NON-SOLVENT TYPE

[75] Inventors: Minoru Takamizawa, Annaka; Humio Okada, Takasaki; Nobuyuki Hasebe; Hiromi Toida, both of Annaka, all of Japan

[73] Assignee: Shinetsu Chemical Company, Tokyo, Japan

[21] Appl. No.: 476,989

[22] Filed: June 6, 1974

[30] Foreign Application Priority Data

June 11, 1973 Japan .................................. 48-65580

[51] Int. Cl.$^2$ ...................... C08L 83/06; C08L 83/14
[52] U.S. Cl. ........................... 260/825; 260/46.5 UA; 260/46.5 H; 260/827; 427/387
[58] Field of Search ........................ 260/825, 46.5 UA

[56] References Cited

U.S. PATENT DOCUMENTS 3,697,473   10/1972   Polmanteer et al. ................. 260/825
3,699,073   10/1972   Wada .................................... 260/825

Primary Examiner—Wilbert J. Briggs, Sr.
Attorney, Agent, or Firm—Toren, McGeady and Stanger

[57] ABSTRACT

Anti-sticking silicone compositions comprising (a) a diorganopolysiloxane of substantially straight-chain molecular structure having vinyldimethylsilyl terminal groups at both chain ends, (b) a diorganopolysiloxane of substantially straight-chain molecular structure having hydrogendimethylsilyl terminal groups at both chain ends, (c) a methylvinylpolysiloxane having at least three vinyl groups bonded to the silicon atoms in one molecule, (d) a methylhydrogenpolysiloxane having at least three hydrogen atoms bonded directly to the silicon atoms in one molecule, and (e) a catalyst for the addition reaction between the silicon-bonded vinyl groups and the silicon-bonded hydrogen atoms, the total amount of components (a) and (b) being preferably more than 30% by weight of the composition.

The compositions, without being diluted with any organic solvents, are applied as a coating on the surfaces of various materials and subsequently heat cured to produce excellent anti-sticking films with superior mechanical properties.

5 Claims, No Drawings

ANTI-STICKING SILICONE COMPOSITIONS OF NON-SOLVENT TYPE

FIELD OF THE INVENTION

This invention relates to a film-forming silicone composition, in particular to a silicone composition of non-solvent type capable of giving non-adhesiveness and excellent anti-sticking properties to the surfaces of paper, films of plastics, plastics-laminated paper, metal foils, and the like.

DESCRIPTION OF THE PRIOR ART

In the prior art, several types of silicone compositions are employed to prevent the adhesion or bonding between the surfaces of various kinds of substrates such as paper or plastic films and various adhesive substances. Two types of anti-sticking silicone compositions are known, which form cured films on the substrates, namely, those cured by the polycondensation reaction with organic tin compounds as the catalyst (see U.S. Pat. Nos. 2,985,545, 2,985,546, and 2,803,613) and those cured by addition reaction catalyzed by platinum compounds (see British Pat. No. 1,240,520).

These compositions are employed in an organic solvent in the form of a solution, or as an aqueous emulsion. For the compositions of the solution type, formulations of the organosiloxanes in a wide variety as well as various kinds of additives and cocatalysts have been proposed in order to obtain desirable anti-sticking, anti-wearing, anti-blocking and curing properties. All of the solution-type compositions contain, however, gum-like diorganopolysiloxanes of extremely high molecular weight of polymerization degree as their main ingredient and they must be diluted with very large volumes of solvents in their use with various types of coating machines in which relatively low viscosities of the solutions are required for successful coating. The use of large volumes of organic solvents necessarily leads to the disadvantages of the serious problems of air pollution or expensiveness in the recovery of the solvents.

On the other hand, the anti-sticking silicone compositions of the aqueous emulsion type present few problems of air pollution, although the use of emulsifying agents may have the possibility of bringing about some environmental problems in addition to having the disadvantage of prolonged heating at high temperatures being necessary to form satisfactory films from the compositions of the aqueous emulsion type. Further, with the films thus obtained from the aqueous emulsion type compositions, it is difficult to achieve superior physical and mechanical properties because organopolysiloxanes of relatively low molecular weight are employed in their formulations in order to avoid the difficulties encountered in the preparation of the aqueous emulsions.

Alternatively, various anti-sticking silicone compositions of non-solvent type have been proposed in order to overcome the above-mentioned disadvantages without the use of organic solvents or water. For example, there has been proposed a composition comprising (a) a vinyl group-containing diorganopolysiloxane fluid having the viscosity from 50 to 4,000 centistokes at 25° C, (b) and organopolysiloxane having at least three hydrogen atoms bonded to the silicon atoms, (c) a platinum catalyst, and (d) an agent for retarding the activity of the catalyst (see German Pat. OLS No. 2,210,380). This composition, however, can not give films with sufficient mechanical strengths and other properties because its main component (a) has a relatively low molecular weight as is indicated by its viscosity of from 50 to 4,000 centistokes at 25° C.

OBJECT OF THE INVENTION

The object of the present invention is to provide anti-sticking silicone compositions of non-solvent type comprising organopolysiloxane components with relatively low polymerization degree, capable of forming excellent anti-sticking films having sufficiently high mechanical strengths as obtained in the prior art only by the compositions comprising the organopolysiloxanes of very high polymerization degree in the prior arts.

SUMMARY OF THE INVENTION

The composition of the invention comprises as its components (a) a diorganopolysiloxane of substantially straight-chain molecular structure having vinyldimethylsilyl terminal groups at both chain ends, and wherein more than 90% of the organic groups bonded to the silicon atoms other than the terminal ones are methyl groups and the remaining groups are monovalent organic groups having no aliphatic unsaturation, (b) a diorganopolysiloxane of substantially straight-chain molecular structure, having hydrogendimethylsilyl terminal groups at both chain ends where more than 90% of the organic groups bonded to the silicon atoms other than the terminal ones are methyl groups and the remaining groups are monovalent organic groups having no aliphatic unsaturation, (c) a methylvinylpolysiloxane having at least three vinyl groups bonded to the silicon atoms in one molecule, (d) a methylhydrogenpolysiloxane having at least three hydrogen atoms bonded directly to the silicon atoms in one molecule, and (e) a catalyst for the addition reaction between the silicon-bonded vinyl groups and the silicon-bonded hydrogen atoms, the total amount of components (a) and (b) being preferably more than 30% by weight of the composition.

According to investigations by the inventors, compositions formulated with components (a) to (e) above having relatively low viscosities can be easily applied in the coating of various kinds of substrate surfaces without the necessity of dilution with an organic solvent or emulsification in an aqueous medium films are produced having excellent anti-sticking properties and sufficient mechanical strengths, by curing for a short time at relatively low temperatures after application. As the characteristic mechanism in the curing step of the compositions of the invention, it is considered that the velocity of addition reaction between the terminal vinyl groups in component (a) and the terminal hydrogen atoms in component (b) is much larger than the reaction velocity between the vinyl groups and the hydrogen atoms bonded to the silicon atoms other than the terminal ones. Therefore, the addition reaction between the terminal vinyl groups and the terminal hydrogen atoms proceeds preferentially at first in the heat curing step bringing about the equivalent effect to the formulations, where a diorganopolysiloxane of very large molecular weight is the main component in the composition.

Component (a) in the composition of the invention is a diorganopolysiloxane of substantially straight-chain molecular structure having vinyldimethylsilyl terminal groups at both ends, and represented by the general formula

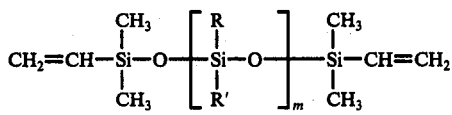

where m is a positive integer and R and R' are monovalent organic groups, more than 90% of which are methyl groups, the remaining being monovalent organic groups having no aliphatic unsaturation such as alkyl groups exemplified by ethyl, propyl and butyl, aryl groups exemplified by phenyl, and halogen-substituted alkyl and aryl groups. The component (a) must have a substantially straight-chain molecular structure as is shown by the general formula above and preferably has a viscosity within the range from 30 to 5,000 centistokes at 25° C. Of course, substantially equivalent effects may be obtained by the component having a branched structure to some extent. Component (a) may be a mixture of diorganopolysiloxanes of different viscosities or different m values in the general formula above.

Component (b) in the compositions of the invention is a diorganopolysiloxane of substantially straight-chain molecular structure having hydrogendimethylsilyl terminal groups at both chain ends, and represented by the general formula

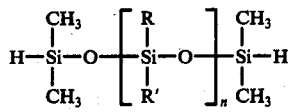

where n is a positive integer and R and R' are the same as defined above. The component (b) must have a substantially straight-chain molecular structure as shown in the general formula above and preferably has a viscosity within the range from 2 to 100 centistokes at 25° C. Of course, substantially equivalent effects may be obtained by the component having a branched structure to some extent.

Component (b) may be a mixture of diorganopolysiloxanes with different viscosities or different n values in the general formula above.

Component (c) in the compositions of the invention, is a methylvinylpolysiloxane having at least three vinyl groups directly bonded to the silicon atoms in one molecule and composed of the siloxane units such as $(CH_2=CH)(CH_3)SiO$, $(CH_2=CH)SiO_{1.5}$, and $(CH_2=CH)(CH_3)_2SiO_{0.5}$ units either singly or in combination therewith or in combination with $(CH_3)_2SiO$, $(CH_3)SiO_{1.5}$ or $(CH_3)_3SiO_{0.5}$ units. The molecular structure of this component (c) may be either straight chain, branched chain or cyclic ring, but the component is preferably a vinylmethylpolysiloxane of substantially straight-chain molecular structure having a viscosity ranging from 10 centistokes at 25° C to a gumlike consistency. Component (c) may be either a single kind of the siloxane polymers or a mixture of more than two kinds of the polysiloxanes having different viscosities.

Component (d) in the compositions of the invention is a methylhydrogenpolysiloxane having at least three hydrogen atoms directly bonded to the silicon atoms and composed of the siloxane units such as $(CH_3)HSiO$, $HSiO_{1.5}$ and $(CH_3)_2HSiO_{0.5}$ units either singly or in combination therewith or in combination with $(CH_3)_2SiO$, $(CH_3)SiO_{1.5}$ or $(CH_3)_3SiO_{0.5}$ units. The molecular structure of component (d) is either straight chain, branched chain or cyclic ring, but is preferably a straight chain like methylhydrogenpolysiloxane or dimethyl methylhydrogenopolysiloxane having a viscosity in the range from 10 to 500 centistokes at 25° C.

Component (e) in the compositions of the invention may be any one of known catalysts for accelerating addition reaction between the Si—CH=CH$_2$ groups and Si—H groups. The most effective of those catalysts are the compounds or complexes of the metals belonging to the platinum group, especially those of platinum. The platinum-containing catalysts are exemplified by chloroplatinic acid, some kinds of the reaction products of chloroplatinic acid and alcohols or aldehydes and the complexes of chloroplatinic acid with several kinds of olefins. The amount of the platinum catalyst to be added to the composition is, calculated as platinum metal, at least 0.1 p.p.m., preferably from 1 p.p.m. to 100 p.p.m. by weight of the total amount of components (a), (b), (c), and (d).

The compositions of the present invention can be prepared by merely blending components (a) to (e) uniformly. It is preferable that the total amount of components (a) and (b) is more than 30% by weight, preferably from 50% to 95% by weight of the composition in order to obtain a chain length, as long as possible, for the straight-chain organopolysiloxane resulting from the addition reaction of components (a) and (b). If the total amount of components (a) and (b) is less than 30% by weight of the composition, the resulting films will be fragile and inferior in their anti-sticking and anti-wearing properties due to deficiency in the long-chained polymer molecules which impart resiliency to the cured films. On the contrary, if the total amount of components (a) and (b) is larger than 95% by weight of the composition, the resulting cured films will be inferior in their mechanical strengths due to deficiency in the crosslinking density, as well as inferior in their anti-blocking property, residual adhesiveness and high-speed peeling resistance.

The suitable ratio of component (a) to component (b) in the composition may vary in a wide range according to their molecular weights and the intended properties of the cured films. Usually, the ratio in the formulation is preferably such that from 0.1 to 1.0 mole of the silicon-bonded hydrogen atoms in component (b) per 1.0 mole of the vinyl groups bonded to the silicon atoms in component (a) is present in the composition. Furthermore, it is preferred that the ratio of the total number of the hydrogen atoms directly bonded to the silicon atoms in components (b) and (d) to the total number of the vinyl groups bonded to the silicon atoms in the components (a) and (c), is in the range from 1:2 to 5:1, and more preferably from 1:1.5 to 3:1. The formulation of the compositions of the present invention may include a small amount of diorganopolysiloxanes of other types having no functional groups.

The anti-sticking compositions of the present invention obtained by the formulations described above have a viscosity within the range from 30 to 10,000 centistokes, preferably from 40 to 6,000 centistokes at 25° C. The preferred viscosity range is defined from the standpoint of workability in the coating process dependent on the coating techniques or coating machines and the intended amount of coating, as well as the material of the substrates to be coated, although higher viscosities than those specified above are preferred in order to attain higher molecular weights of the polymer molecules in the cured films. For example, lower viscosities, say, 30 to 200 centistokes, are preferred in order to be able to control the amount of coating within the appropriate range, in the coating of polyethylene-laminated papers, plastics films and metal foils by means of known coating machines such as roller-coaters, air-coaters, gravure-coaters or curtain-flow coaters where the practical amount of coating is usually in the range from 0.3 to 5.0 g/m², and preferably from 0.5 to 1.0 g/m². On the other hand, higher viscosities are preferred in the coating of materials such as glassine papers, kraft papers and clay-undercoated papers into which the liquid compositions are readily absorbed.

Although the claimed viscosity range of the compositions of the present invention is limited from the practical standpoint to a range below 10,000 centistokes, similar compositions with higher viscosities up to 10,000 centistokes can be successfully applied for the coating of some materials owing to the remarkable recent progress of the coating technology in which the techniques of offset printing is ingeniously utilized.

In order to obtain cured films with satisfactory properties in the application of the compositions of the present invention, coated materials are heated for 5 to 60 seconds at an elevated temperature of 80° to 160° C. If it is required to extend the pot life of the prepared compositions or to lessen the activity of the platinum catalyst at room temperature, it is recommended to add some retarding agents such as nitrogen-containing organic compounds exemplified by various kinds of amino compounds and oxime compounds, organophophorus compounds exemplified by various kinds of phosphines, and alcohols containing acetylenic unsaturation.

In the following examples, parts are all parts by weight and the viscosities expressed in centistokes are at 25° C.

EXAMPLE 1

Four kinds of organopolysiloxanes, namely, (a) 74.0 parts of dimethylpolysiloxane terminated by vinyldimethylsilyl groups at both chain ends and having a viscosity of 190 centistokes, (b) 2.0 parts of dimethylpolysiloxane terminated by hydrogendimethylsilyl groups at both chain ends and having a viscosity of 5 centistokes, (c) 30.0 parts of methylvinylpolysiloxane terminated by trimethylsilyl groups at both chain ends and having a viscosity of 45 centistokes, 10 mole % of the siloxane units therein being vinylmethylsiloxane units, and (d) 3.5 parts of methylhydrogenpolysiloxane terminated by trimethylsilyl groups at both chain ends and having a viscosity of 25 centistokes were blended homogeneously, to form a liquid composition having the viscosity of 116 centistokes. In the liquid composition, the molar ratio of the silicon-bonded hydrogen atoms to the silicon-bonded vinyl groups (Si—H)/(Si—CH=CH$_2$) was 0.96, while the molar ratio of the silicon-bonded hydrogen atoms in component (b) to the silicon-bonded vinyl groups in component (a) was 0.4.

To the liquid composition was added chloroplatinic acid-ethylene complex catalyst in an amount of 15 p.p.m. as platinum metal, and the mixture was stirred to homogeneity. A sheet of polyethylenelaminated paper was uniformly coated with the mixture composition, in an amount of 2 g/m², by means of a gravure-coater and then subjected to heat curing for 20 seconds in an air oven and kept at 140° C to produce a glossy non-adhesive film superior in anti-wearing, anti-blocking and high-speed peeling properties. The peeling resistance of the thus treated polyethylene-laminated paper against several adhesives, was measured by the transferring process at the peeling velocity of 300 mm/minute. The resultant peel resistance was 18 g/5 cm for a gummy adhesive and 40 g/4 cm for an acrylic adhesive, showing that the films formed on the paper were by no means inferior in their properties to those obtained by use of commercial anti-sticking compositions of the solution type.

In this example and in the examples and controls to follow, the anti-wearing and anti-blocking tests were conducted in the following manners.

Anti-wearing test:

A cured film adhered to the substrate was rubbed forcedly with a finger, during which the peeling of the film was observed.

Anti-blocking test:

The treated surface, immediately after the heat curing, was pressed against another treated surface for 20 hours at 50° C under the pressure of 100 kg/cm², and the bonding of the surfaces was observed.

EXAMPLE 2

Four kinds of organopolysiloxanes, namely, (a) 90 parts of dimethylpolysiloxane terminated by vinyldimethylsilyl groups at both chain ends and having a viscosity of 45 centistokes, (b) 2.5 parts of the same dimethylpolysiloxane as used in Example 1, (c) 7.6 parts of the same methylvinylpolysiloxane as used in Example 1, and (d) 3.7 parts of methylhydrogenpolysiloxane terminated by trimethylsilyl groups at both chain ends and having a viscosity of 25 centistokes were blended homogeneously to form a liquid composition having the viscosity of 42 centistokes. In the liquid composition, the (Si—H)/(Si—CH=CH$_2$) molar ratio was 1.04, while the molar ratio of the silicon-bonded hydrogen atoms in component (b) to the silicon-bonded vinyl groups in component (a) was 0.17.

To the liquid composition was added chloroplatinic acid-ethanol complex catalyst in an amount of 20 p.p.m., as platinum metal, and the mixture was stirred to homogeneity. A sheet of polyethylene-laminated paper was uniformly coated with the mixture composition in an amount of 0.7 g/m² therefor by means of an offset type coating machine and then subjected to heat curing for 30 seconds at 140° C to produce a non-adhesive film superior in anti-wearing and anti-blocking properties. The values for the peeling resistance, as determined by the transferring process as in Example 1, were 14 g/5 cm for the gummy adhesive and 34 g/5 cm for the acrylic adhesive.

EXAMPLE 3

Four kinds of organopolysiloxanes, namely, (a) 147.6 parts of dimethylpolysiloxane terminated by vinyldimethylsilyl groups at both chain ends and having a viscosity of 570 centistokes, (b) 8.0 parts of dimethylpolysiloxane terminated by hydrogendimethylsilyl groups at both chain ends and having a viscosity of 15 centistokes, (c) 25.0 parts of vinylmethylpolysiloxane terminated by trimethylsilyl groups at both chain ends and having a viscosity of 95.0 centistokes, 5 mole % of the siloxane units therein being vinylmethylsiloxane units, and (d) 2.5 parts of the same methyl hydrogenpolysiloxane as used in Example 1 were blended homogeneously, to form a liquid composition having a viscosity of 495 centistokes. In the liquid composition, the (Si—H)/(Si- —CH=CH$_2$) molar ratio was 0.92, while the molar ratio of the silicon-bonded hydrogen atoms in component (b) to the silicon-bonded vinyl groups in component (a) was 0.5.

The same kind and the same amount of the platinum catalyst as in Example 2 was added to the liquid composition obtained above, and the mixture composition was stirred to homogeneity. A sheet of kraft paper was coated with the mixture composition in an amount of 1.0 g/m$^2$, by the same process as in Example 2, and then subjected to heat curing for 30 seconds at 160° C to produce a non-adhesive releasing paper superior in anti-wearing and anti-blocking properties. The values of the peeling resistance, as determined by the transferring process as in Example 1, were 53 g/5 cm for the gummy adhesive and 45 g/5 cm for the acrylic adhesive, which values were as good as the values obtained by the use of commercial anti-sticking compositions of solution type.

EXAMPLE 4

Four kinds of organopolysiloxanes, namely, (a) 148.5 parts of diorganopolysiloxane terminated by vinyldimethylsilyl groups at both chain ends and having a viscosity of 712 centistokes, 0.5 mole % and 99.5 mole % of the siloxane units therein being phenylmethylsiloxane units and dimethylsiloxane units, respectively, (b) 2.0 parts of the same dimethylpolysiloxane as used in Example 1, (c) 10.4 parts of vinylmethylpolysiloxane terminated by vinyldimethylsilyl groups at both chain ends and having a viscosity of 48 centistokes, 25 mole % and 75 mole % of the siloxane units therein being vinylmethylsiloxane units and dimethylsiloxane units, respectively, and (d) 4.0 parts of the same methylhydrogenpolysiloxane as used in Example 1 were blended homogeneously, to form a liquid composition having a viscosity of 515 centistokes. In the liquid composition, the (Si—H)/(Si—CH=CH$_2$) molar ratio was 0.74, while the molar ratio of the silicon-bonded hydrogen atoms in component (b) to the silicon-bonded vinyl groups in component (a) was 0.4.

The same kind and amount of the platinum catalyst as in Example 2 was added to the liquid composition obtained above, and polyester film was coated with the composition in an amount of 0.6 g/m$^2$ by means of an offset type coating machine. Subsequent heat curing for 30 seconds at 100° C produced a releasing film having excellent peeling, anti-wearing and anti-blocking properties. The values of the peeling resistance as determined by the transferring process as in Example 1 were 45 g/5 cm for the gummy adhesive and 70 g/5 cm for the acrylic adhesive, which values were as good as the values obtained by the use of commercial anti-sticking compositions of solution type.

EXAMPLE 5

Four kinds of organopolysiloxanes, namely, (a) 150 parts of the same dimethylpolysiloxane as used in Example 2, (b) 5.0 parts of the same dimethylpolysiloxane as used in Example 1, (c) 7.5 parts of dimethylpolysiloxane gum containing 5 mole % of methylvinylsiloxane units and (d) 9.0 parts of methylhydrogenpolysiloxane having a viscosity of 25 centistokes were blended homogeneously, to form a liquid composition having a viscosity of 92 centistokes. In the liquid composition the (Si—H)/(Si—CH=CH$_2$) molar ratio was 0.66, while the molar ratio of the silicon-bonded hydrogen atoms in component (b) to the silicon-bonded vinyl groups in component (a) was 0.2.

The same platinum catalyst as used in Example 1 was added to the liquid composition obtained above, in an amount of 20 p.p.m. as platinum metal. A sheet of polyethylene-laminated paper was coated uniformly with the mixture composition, in an amount of 0.6 g/m$^2$, by means of an offset type coating machine. Subsequent heat curing for 20 seconds at 140° C, produced releasing paper having excellent anti-wearing and anti-blocking properties. The values of the peeling resistance determined by the transferring process and in Example 1 were 15 g/5 cm for the gummy adhesive and 30 g/5 cm for the acrylic adhesive.

EXAMPLE 6

Four kinds of organopolysiloxanes, namely, (a) 75 parts of the same dimethylpolysiloxane as used in Example 1, (b) 4.0 parts of the same dimethylpolysiloxane as used in Example 3, (c) 37 parts of vinylmethylpolysiloxane having a viscosity of about 100,000 centistokes 3 mole % of the organic groups therein being vinyl groups, and (d) 7.0 parts of dimethyl-methyl-hydrogenpolysiloxane terminated by trimethylsilyl groups at both chain ends and having a viscosity of 30 centistokes, 50 mole % of the siloxane units therein being methylhydrogensiloxane units, were blended homogeneously, to form a liquid composition having a viscosity of about 1,000 centistokes. In the liquid composition the (Si—H)/(Si—CH=CH$_2$) molar ratio was 0.64, while a molar ratio of the silicon-bonded hydrogen atoms in component (b) to the silicon-bonded vinyl groups in component (a) was 0.25.

To the liquid composition were added the same platinum catalyst as used in the preceding example, in an amount of 20 p.p.m. as platinum metal, and 2-methyl-2-hydroxybutyn-1-ol as the pot-life extender in an amount of 0.3 %. A sheet of glassine paper was coated with the mixture composition uniformly in an amount of 0.8 g/m$^2$ by means of an offset type coating machine with subsequent heat curing for 30 seconds at 150° C to produce releasing paper having excellent anti-wearing and anti-blocking properties. The values of the peeling resistance as determined by the transferring process were 40 g/5 cm for the gummy adhesive and 48 g/5 cm for the acrylic adhesive. The composition prepared above was stable at room temperature, showed negligible viscosity increase after 24 hours of standing, and no adverse effects were observed in its workability and the properties of the cured films.

EXAMPLE 7

Four kinds of organopolysiloxanes namely, (a) 149 parts of dimethylpolysiloxane terminated by vinyldimethylsilyl groups at both chain ends having a viscosity of about 3,000 centistokes, (b) 2.0 parts of the same dimethylpolysiloxane as used in Example 1, (c) 30 parts of vinylmethylpolysiloxane terminated by trimethylsilyl groups at both chain ends and having the viscosity a 1,000 centistokes, 6 mole % of the siloxane units therein being vinylmethylsiloxane units, and (d) 10.5 parts of methylhydrogenpolysiloxane terminated by dimethylhydrogensilyl groups at both chain ends and having a viscosity of 20 centistokes, 30 mole % of the siloxane units therein being hydrogenmethylsiloxane units and the remaining being dimethylsiloxane units, were blended homogeneously, to form a liquid composition having a viscosity of about 1,800 centistokes. In the liquid composition the (Si—H)/(Si—CH=CH$_2$) molar ratio was 0.50, while the molar ratio of the silicon-bonded hydrogen atoms in component (b) to the silicon-bonded vinyl groups in component (a) was 0.8.

To the liquid composition were added the same platinum catalyst and the same pot-life extender in the same amounts as used in Example 6. Kraft paper was coated with the resulting composition in an amount of 0.6 g/m$^2$, by means of an offset type coating machine, with subsequent heat curing for 30 seconds at 140° C. The resulting releasing paper was superior in its peeling resistance and anti-wearing and anti-blocking properties in comparison to similar products obtained by use of commercial solution-type silicone anti-sticking compositions.

EXAMPLE 8.

Four kinds of organopolysiloxanes, namely, (a) 149 parts of dimethylpolysiloxane terminated by vinyldimethylsilyl groups at both chain ends and having the viscosity of about 3,000 centistokes, (b) 2.0 parts of dimethylpolysiloxane terminated by hydrogendimethylsilyl groups at both chain ends and having the viscosity of about 5 centistokes, (c) 45 parts of vinylmethylpolysiloxane terminated by trimethylsilyl groups at both chain ends and having a viscosity of about 100,000 centistokes, 5 mole % of siloxane units therein being vinylmethylsiloxane units, and (d) 5.0 parts of methylhydrogenpolysiloxane terminated by trimethylsilyl groups at both chain ends and having a viscosity of about 25 centistokes were blended homogeneously, to form a liquid composition having a viscosity of 5,500 centistokes. In the liquid composition the (Si—H)/(Si—CH=CH$_2$) molar ratio was 0.48, while the molar ratio of the siliconbonded hydrogen atoms in component (b) to the siliconbonded vinyl groups in component (a) was 0.8.

To the liquid composition were added the same palatinum catalyst and the same pot-life extender in the same amounts as in Example 6. A sheet of clay-undercoated paper was uniformly coated with the composition in an amount of 0.8 g/m$^2$ by means of an offset type coating machine with subsequent heat curing for 30 seconds at 150° C. The resulting releasing paper had excellent peeling resisting, anti-wearing and anti-blocking properties, which properties were equal to those of similar products obtained from conventional anti-sticking silicone compositions of the solution type.

Control 1 to 6

These controls correspond to over Example 2.

Four kinds of the same organopolysiloxanes as used in Example 2 were blended homogeneously to formulate six liquid compositions, each composition having a different percentage of the total of components (a) and (b) in the whole composition, a different molar ratio of (Si—H)/(Si—CH=CH$_2$) in components (b) and (a), and a different molar ratio of (Si—H)/(Si—CH=CH$_2$) in the whole composition, as indicated in Table I.

To each of the liquid compositions were added the same platinum catalyst, in the same amount, as used in Example 2. A sheet of polyethylene-laminated paper was uniformly coated with the compositions and subsequently heat cured under the same conditions as in Example 2. The properties of the cured films were tested with respect to peeling resistance, anti-wearing and anti-blocking as in Example 2, as well as cured condition, and the results are shown in Table II.

Table I

|  | $\frac{(a)+(b)}{(a)+(b)+(c)+(d)}$ | Molar Ratio of $\frac{(Si-H) \text{ in } (b)}{(Si-CH=CH_2) \text{ in } (a)}$ | Molar Ratio of $\frac{(Si-H) \text{ in } (b)+(d)}{(Si-CH=CH_2) \text{ in } (a)+(c)}$ |
|---|---|---|---|
| Control 1 | 25.0% | 0.167 mole % | 0.96 mole % |
| 2 | 98.2 | 0.455 | 0.92 |
| 3 | 89.0 | 0.083 | 0.96 |
| 4 | 87.3 | 1.170 | 1.04 |
| 5 | 75.6 | 0.333 | 5.36 |
| 6 | 84.6 | 0.167 | 0.45 |
| Example 2 | 89.1 | 0.167 | 0.96 |

Table II

| | Cured Condition | Peeling Resistance A | Peeling Resistance B | Anti-wearing | Anti-blocking |
|---|---|---|---|---|---|
| Control 1 | Good | 30 | 68 | Poor | Good |
| 2 | No cure (very tacky) | 12 | 30 | — | Good |
| 3 | Good | 75 | 120 | Poor | Good |
| 4 | Good | 35 | 60 | Good | Poor |
| 5 | Good | 250 | 320 | Good | Poor |
| 6 | Poor* | 15 | 28 | Good | Poor |
| Example 2 | Good | 14 | 34 | Good | Good |

*Cured at 160° C, 80 seconds.
Peeling resistance A is for the gummy adhesive and B is for the acrylic adhesive.

What is claimed is:

1. An anti-sticking, non-solvent type silicone composition which comprises
   a. a diorganopolysiloxane of substantially straight-chain molecular structure having vinylmethylsilyl terminal groups at both chain ends, more than 90% of the organic groups bonded to the silicon atoms other than the terminal silicon atoms therein being methyl groups and the remaining organic groups being monovalent organic groups having no aliphatic unsaturation, and having a viscosity within the range between 30 centistokes and 5,000 centistokes at 25° C,
   b. a diorganopolysiloxane of substantially straight-chain molecular structure having hydrogendimethylsilyl terminal groups at both chain ends, more than 90% of the organic bonded to the silicon atoms other than the terminal silicon atoms therein being methyl groups and the remaining organic groups being monovalent organic groups having no aliphatic unsaturation, and having a viscosity within the range between 2 centistokes and 100 centistokes at 25° C,
   c. a methylvinylpolysiloxane having at least three vinyl groups bonded directly to the silicon atoms in one molecule, and having a viscosity within the range between 10 centistokes to gum-like consistency at 25° C,
   d. a methylhydrogenpolysiloxane having at least three hydrogen atoms bonded directly to the silicon atoms in one molecule, and having a viscosity within the range between 10 centistokes and 500 centistokes at 25° C, and e. a catalyst capable of accelerating addition reaction between the vinyl groups bonded directly to the silicon atoms and the hydrogen atoms bonded directly to the silicon atoms;

said anti-sticking composition having a viscosity within the range between 30 centistokes and 10,000 centistokes at 25° C, and wherein the molar ratio of the hydrogen atoms bonded directly to the silicon atoms in said component (b) to the vinyl bonded directly to the silicon atoms in said component (a) is within the range between 0.1 and 1.0; the molar ratio of the hydrogen atoms bonded directly to the silicon atoms in said components (b) and (d) to the vinyl groups bonded directly to the silicon atoms in said components (a) and (c) is within the range between 0.5 and 5.0; and the total amount of said components (a) and (b) is from 30 to 95% by weight based on the weight of the composition.

2. The anti-sticking silicone composition as claimed in claim 1 which has a viscosity within the range between 40 centistokes and 6,000 centistokes at 25° C.

3. The anti-sticking silicone composition as claimed in claim 1 wherein said catalyst is a platinum-containing compound.

4. The anti-sticking silicone composition as claimed in claim 1 further comprising a retarding agent for the activity of said catalyst.

5. An anti-sticking silicone composition of non-solvent type having a viscosity within the range between 40 centistokes and 6,000 centistokes at 25° C, which comprises a. a diorganopolysiloxane of substantially straight-chain molecular structure having vinyldimethylsilyl terminal groups at both chain ends and having a viscosity within the range between 30 centistokes and 5,000 centistokes at 25° C, more than 90% of the organic groups bonded to the silicon atoms other than the terminal silicon atoms therein being methyl groups and the remaining organic groups being monovalent organic groups having no aliphatic unsaturation, b. a diorganopolysiloxane of substantially straight-chain molecular structure having hydrogendimethylsilyl terminal groups at both chain ends and having a viscosity within the range between 2 centistokes and 100 centistokes at 25° C, more than 90% of the organic groups bonded to the silicon atoms other than the terminal silicon atoms therein being methyl groups and the remaining organic groups bineg monovalent organic groups having no aliphatic unsaturation, c. a methylvinylpolysiloxane having a viscosity within the range between 10 centistokes and gum-like consistency at 25° C and having at least three vinyl groups bonded directly to the silicon atoms in one molecule, d. a methylhydrogenpolysiloxane having a viscosity within the range between 10 centistokes and 500 centistokes at 25° C and having at least three hydrogen atoms bonded directly to the silicon atoms in one molecule, and e. a platinum-containing catalyst capable of accelerating the addition reaction between the vinyl groups bonded directly to the silicon atoms and the hydrogen atoms bonded directly to the silicon atoms the total amount of said components (a) and (b) being from 30 to 95% by weight based on the weight of the composition, the molar ratio of the hydrogen atoms bonded directly to the silicon atoms in said component (b) to the vinyl groups bonded directly to the silicon atoms in said component (a) being within the range between 0.1 and 1.0, and the molar ratio of the hydrogen atoms bonded directly to the silicon atoms in said components (b) and (d) to the vinyl groups bonded directly to the silicon atoms in said components (a) and (c) being within the range between 0.5 and 5.0.

* * * * *

UNITED STATES PATENT OFFICE
CERTIFICATE OF CORRECTION

Patent No. 4,057,596     Dated November 8, 1977

Inventor(s) Minoru Takamizawa et al

It is certified that error appears in the above-identified patent and that said Letters Patent are hereby corrected as shown below:

In the heading of the patent, [30] should read as follows:

-- [30]  Foreign Application Priority Data

June 11, 1973.......Japan     48-65580
May 2,  1974.......Japan     49-49342--.

Signed and Sealed this

*Fourteenth* Day of *February 1978*

[SEAL]

*Attest:*

RUTH C. MASON
*Attesting Officer*

LUTRELLE F. PARKER
*Acting Commissioner of Patents and Trademarks*